United States Patent [19]

Giordano et al.

[11] Patent Number: 4,938,995

[45] Date of Patent: Jul. 3, 1990

[54] FLUOROPOLYMER THIN FILM COATINGS AND METHOD OF PREPARATION BY PLASMA POLYMERIZATION

[75] Inventors: Paul J. Giordano, Hudson; George W. Prohaska, Willoughby; Richard C. Smierciak, Streetsboro, all of Ohio

[73] Assignee: The Standard Oil Company, Cleveland, Ohio

[21] Appl. No.: 352,676

[22] Filed: May 10, 1989

Related U.S. Application Data

[63] Continuation of Ser. No. 94,473, Aug. 8, 1987, abandoned.

[51] Int. Cl.[5] .................. B05D 3/06; C08G 73/24; C08G 65/22

[52] U.S. Cl. .................. 427/41; 427/39; 528/401; 528/402

[58] Field of Search .................. 427/41, 40, 39, 38; 528/401, 402

[56] References Cited

U.S. PATENT DOCUMENTS

| | | | |
|---|---|---|---|
| 3,676,350 | 7/1972 | Wright et al. | 430/109 |
| 4,264,750 | 4/1981 | Amand et al. | 525/356 |
| 4,391,843 | 7/1983 | Kaganowicz et al. | 427/41 |
| 4,404,256 | 9/1983 | Amand et al. | 428/409 |
| 4,419,404 | 12/1983 | Arai et al. | 427/41 |
| 4,421,843 | 12/1983 | Hattori et al. | 427/41 |
| 4,737,415 | 4/1988 | Ichijo et al. | 427/41 |
| 4,816,334 | 3/1989 | Yokoyama et al. | 427/41 |
| 4,845,268 | 7/1989 | Ohsaka et al. | 528/402 |

OTHER PUBLICATIONS

R. D'Agostino et al., "Diagnostics and Decomposition Mechanism in Radio-Frequency Discharges of Fluorocarbons Utilized for Plasma Etching or Polymerization; Plasma Chemistry and Plasma Processing", 2, 213-231 (1982).

R. D'Agostino et al., "Mechanisms of Etching and Polymerization in Radio-Frequency Discharges of $CF_4$—$H_2$, $CF_4$—$C_2F_4$, $C_2F_6$—$H_2$, $C_3F_8$—$H_2$", J. Appl. Phys., 54, 1284-1288 (1983).

T. F. Retajczyk, Jr. et al., "Properties of Plasma-Deposited Films Using Elkylene and Fluoroethylenes as Starting Monomers", Materials Letters, 2, 23-26 (1983).

E. Kay et al., "Plasma Chemistry of Fluorocarbons as Related to Plasma Etching and Plasma Polymerization", *Topics in Current Chemistry*, 94, 1-40 (1980).

E. A. Truesdale et al., "The Effect of Added Hydrogen on the RF Discharge Chemistry of $CF_4$, $CF_3H$, and $C_2F_6$", J. Appl. Phys., 50, 6594-6599 (1979).

Masuoka et al., "Plasma Polymerization of Hexafluoroethane", J. Polymer Science, 20, 2633-2642 (1982).

D. J. Astell-Burt et al., "A Study of the Deposition of Polymeric Material onto Surfaces from Fluorocarbon RF Plasmas", Plasma Chemistry and Plasma Processing, 6, 417-427 (1986).

*Primary Examiner*—Norman Morgenstern

*Assistant Examiner*—Marianne Padgett

*Attorney, Agent, or Firm*—Larry W. Evans; Joseph G. Curatolo; Sue E. Phillips

[57] ABSTRACT

The subject invention relates to a process for the deposition of an oxygen-containing high fluoropolymer thin film onto an approxpriate substrate comprising loading the substrate in an enclosed reactor; evacuating the reactor; charging the reactor with an inert carrier gas and an oxygen-containing fluorocarbon monomer feed gas; and plasma-polymerizing the feed gas such that a thin film of polymerized monomer is deposited onto the substrate.

The invention further relates to an insulation material comprising the fluoropolymer thin film recited above, a plasma polymerized thin film of an oxygen-containing fluoropolymer, and the use of a polymerization precursor monomer for such thin films that is an oxygen-containing fluorocarbon monomer.

6 Claims, 2 Drawing Sheets

MULTI-LAYER CONDUCTIVE STRUCTURE

MULTI-LAYER CONDUCTIVE STRUCTURE

FLUOROPOLYMER THIN FILM COATINGS AND METHOD OF PREPARATION BY PLASMA POLYMERIZATION

This is a continuation of co-pending application Ser. No. 094,473, filed on Sept. 8, 1987 now abandoned.

FIELD OF THE INVENTION

The present invention provides for the plasma deposition of oxygen-containing thin film fluoropolymers on appropriate substrates.

BACKGROUND OF THE INVENTION

Plasma polymerized thin films generated from fluorinated organic monomeric gases have been studied and characterized in the literature as good electrical insulators. The low dielectric constant of fluoropolymer thin films is a prime characteristic to fulfill the need in the integrated circuit industry for a material, with good insulating properties toward electrical charge and signal, for use in the manufacture of high density, high speed integrated circuits. The fluoropolymer thin film deposited from the $C_2F_4$ monomer, for example, demonstrates a dielectric constant of approximately 2.7.

Fluorinated organic monomers can be either surface etching in nature or plasma polymerizing in nature. This characteristic depends on the atomic fluorine to fluorocarbon ratio, $F/CF_x$ wherein x is between 1 and 3, in the reactive plasma. In "Diagnostics and Decomposition Mechanism in Radio-Frequency Discharges of Fluorocarbons Utilized for Plasma Etching or Polymerization", *Plasma Chemistry and Plasma Processing,* 2, 213–231 (1982) and "Mechanism of Etching and Polymerization in Radio-Frequency Discharges of $CF_4$-$H_2$, $CF_4$-$C_2F_4$, $C_2F_6$-$H_2$, $C_3F_8H_2$", J. Appl. Phys., 54, 1284–1288 (1983), d'Agostino et al. have shown that the addition of C-H groups, hydrogen, or unsaturates such as $F_2C{=}CF_2$, increases the amount of CF radicals that are formed, thus the polymer deposition rate increases. The addition of hydrogen depletes the amount of fluorine present, thereby enhancing the polymerizing character of the feed gas.

The presence of even the slightest amount of oxygen in the feed gas inhibits the formation of plasma polymerized thin films and enhances the etching characteristic of the gas. The oxygen content in the feed causes the $CF_x$ component to become C-O-F, thus there is a net increase in free fluorine, and this, along with the presence of oxygen results in high surface etch rates. Therefore, oxygen-containing fluorocarbons have not been used as thin film precursors, though fluorocarbons without oxygen have been used.

The fluorocarbons used in the industry to prepare thin films, however, suffer from a severe drawback. This drawback is the slow rate at which known fluorocarbons can be deposited by the plasma polymerization process. Retajczyk et al. in "Properties of Plasma-Deposited Films Using Ethylene and Fluoroethylenes as Starting Monomers", Materials Letters, 2, 23–26 (1983), have shown that by controlling the fluorine to carbon ratio of the starting monomer, the deposition rate can also be controlled. As the fluorine to carbon ratio of the monomer increases, the deposition rate also increases, which is demonstrated by the fact that $C_2F_4$ deposits at approximately 100 Angstroms/minute, $C_2H_2F_2$ at 300 Angstroms/minute, and $C_2HF_3$ at 600 Angstroms/minute. However, what has also been shown is that while the deposition rate can be increased to a more practical rate by controlling the F/C ratio, the dielectric constant for the thin film also increases, decreasing the thin films insulation efficiency. Thus, while the deposition rate increases from 100 Angstroms/minute to 300 Angstroms/minute from $C_2F_4$ to $C_2H_2F_2$, the dielectric constant increases concomitantly from 2.7 to 3.3 respectively. Therefore, what is gained in one respect is lost in another equally important respect.

There is a present need for a means for increasing the deposition rate of a high fluoropolymer thin film without a corresponding increase in the dielectric constant of the resulting film.

It is one object of the present invention, therefore, to provide a process by which a fluoropolymer thin film can be deposited at a reasonable rate while maintaining a low dielectric constant.

It is a further object of the present invention to provide a thin film deposited starting monomer by plasma polymerization, having a low dielectric constant.

SUMMARY OF THE INVENTION

The subject invention relates to a process for the deposition of an oxygen-containing high fluoropolymer thin film onto an approxpriate substrate comprising loading the substrate in an enclosed reactor; evacuating the reactor; charging the reactor with an inert carrier gas and an oxygen-containing fluorocarbon monomer feed gas; and plasma-polymerizing the feed gas such that a thin film of polymerized monomer is deposited onto the substrate.

The invention further relates to an insulation material comprising the fluoropolymer thin film recited above, a plasma polymerized thin film of an oxygen-containing fluoropolymer, and the use of a polymerization precursor monomer for such thin films that is an oxygen-containing fluorocarbon monomer.

DETAILED DESCRIPTION

Figure 1:
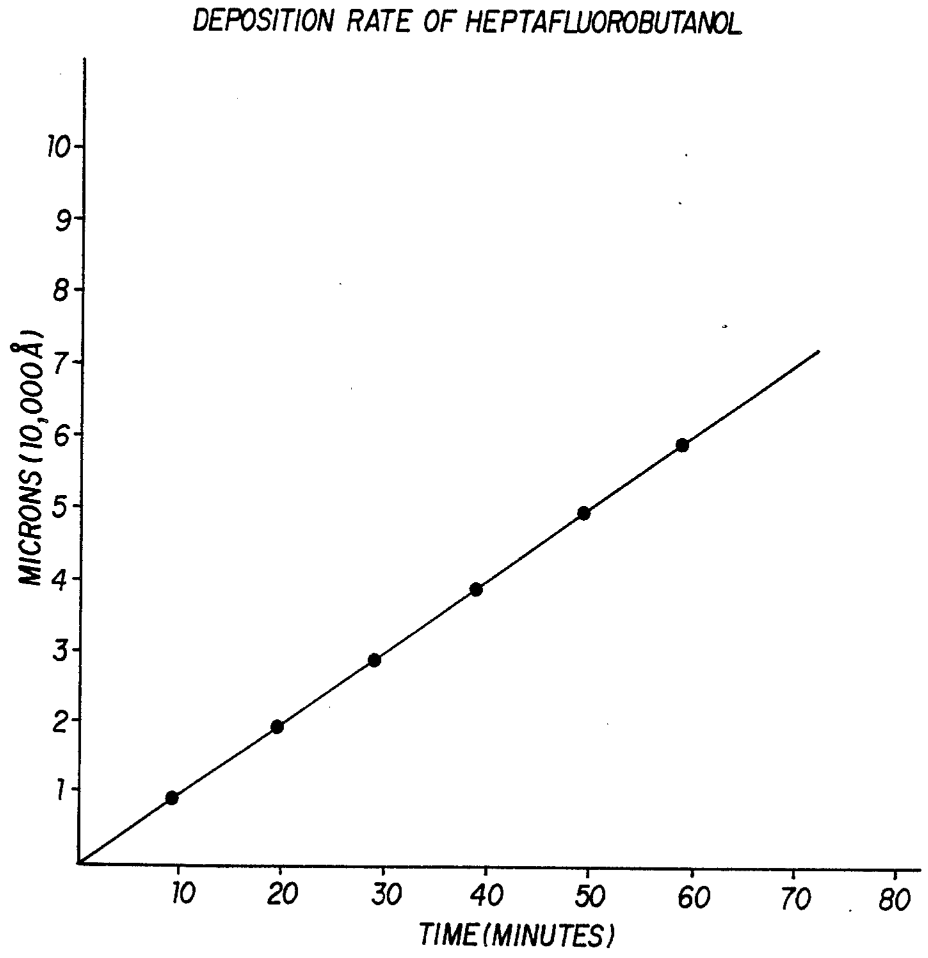
FIG. 1 is a rate curve demonstrating consistency of the deposition rate of a heptafluorobutanol HFB thin film over an extended period of time.

The subject invention relates to a process for the deposition of high fluoropolymer-containing thin films at reasonable deposition rates while maintaining low dielectric constant values. As used herein, the term "thin film" refers to dense, cross-linked, and substantially continuous and pinhole-and void-free films that are up to 100,000 Angstroms thick. The term "high fluoropolymer-containing", as used herein with respect to thin films, means containing between about 30% atomic to about 50% atomic fluorine.

While the contemplated use of the fluoropolymer thin films disclosed herein is directed to thin film insulation in capacitors, or to interlayer dielectrics, these films would also have application in the areas of sensors, electronic packaging, encapsulation, humidity resistance, and still others which will be readily discernable to those skilled in the art.

Plasma polymerized thin films characteristically exhibit excellent adhesion properties. Any substrate which can accept and maintain a plasma polymerized thin film may be used as the substrate in the instant inventive process. Best results are obtained if the substrate surface is relatively clean and dry, as these conditions affect the adhesive properties of the thin film. Suitable substrates include, but are not limited to, metal, glass, and plastic.

Organic monomers considered useful as thin film precursors within the subject inventive method include monomers containing fluorine and oxygen. The monomer will polymerize from the plasma state such that a dense thin film is deposited uniformly over the substrate surface. Preferably, the configuration of the monomer is such that an OH group is at the alpha position with respect to the perfluoro group. This monomer configuration readily lends itself to plasma polymerization due to the electronegativity of the oxygen in the monomer. The electron withdrawing power of the OH and perfluoro groups causes the electron density surrounding the carbon between these two groups to be withdrawn resulting in the monomer being easily cleaved at that carbon and leaving a radical suitable for polymerization. These monomers, when polymerized, form thin films at high deposition rates.

Compounds suitable for use as precursor monomers include fluorinated organic monomers of two general classifications. One class consists of compounds wherein the oxygen is attached to the carbon with the extractable hydrogen. The second class consists of compounds wherein the oxygen is on a carbon one removed from the carbon with the extractable hydrogen.

I. Class I

Alcohols defined by the formula:

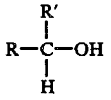

Ethers defined by the formula:

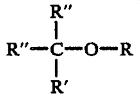

Epoxides defined by the formula:

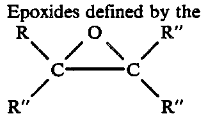

Peroxides defined by the formula:

R—O—O—R' and

Anhydrides defined by the formula:

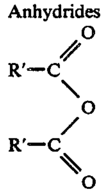

II. Class II

Acids defined by the formula:

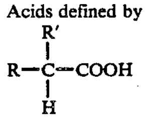

Esters defined by the formula:

-continued

II. Class II

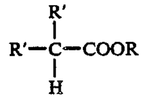

Ketones defined by the formula:

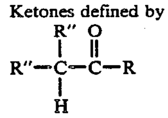

and

Aldehydes defined by the formula:

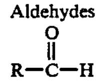

In the formulas presented hereinabove,

R is defined as a perfluoro carbon group having at least 1 to 9 carbons, preferably 2–8 carbons, most preferably 3 to 4 carbons, including, where appropriate, linear and branched aliphatic and aromatic groups;

R' is defined as H or R; and

R" is defined as F or

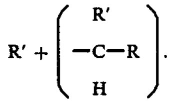

Exemplary fluorocarbon monomers include heptafluorobutanol, pentafluorodimethyl ether, perfluoropropylene oxide, bis(trifluoromethyl) peroxide, heptafluorobutyric anhydride, x-hydroperfluoroisobutyric acid, (perfluoropropenyl-2) acetate and trifluoroacetaldehyde. The preferred fluorocarbon is heptafluorobutanol, or HFB. The position of the oxygen atom in these compounds promotes a deposition rate increased over that of commonly used fluorocarbon monomers which do not contain oxygen, yet the resulting thin film has a low dielectric constant.

The presence of free radicals in the polymerization process allows for cross-linking of the monomer segments in such a manner that the resultant thin film is dense, and substantially continuous and pinhole- and void-free. The thin film, due to the derivation from the precursor monomer containing fluorine and hydroxy groups next to or in close proximity to the carbon with the extractable hydrogen, will deposit at rates of approximately 500 Angstroms/minute to approximately 5,000 Angstroms/minute, depending on processing parameters. The dielectric constants exhibited by these oxygen-containing, high fluoropolymer thin films will range from about 2.3 to about 3.3.

The plasma polymerized thin film disclosed herein is deposited by subjecting the organic monomer, in the gaseous state, to electromagnetic energy of an appropriate frequency and power such that a plasma of the gaseous medium is formed. The gaseous monomer is exposed to a plasma glow discharge which forms ion radicals and other electronically excited species which deposit on the substrate surface and are polymerized, yielding a thin film thereon.

Suitable systems for depositing a thin film on a given substrate according to the procedure disclosed herein include a microwave plasma generator system, direct current system, audio frequency system, radio frequency system, or other conventional or commercially known power system. If a microwave plasma generator system is employed, the apparatus is essentially a vacuum chamber, such as a glass tube reactor, glass bell jar or other similar enclosure. This glass portion is enclosed by an electromagnetic energy plasma generator. The substrate to be coated is positioned within the tube such that maximum thin film deposition occurs with uniformity of coverage. A first outlet into the reaction tube allows for evacuation of the system, and two other outlets are connected to gas bleed systems, one for adding the organic monomer gas, and the other for an inert carrier gas, such as argon, helium, or other appropriate carrier gas.

In carrying out the deposition process, the glass reaction tube is first evacuated to about $10^{-3}$ to about $10^{-6}$ Torr. The tube is then charged with an inert gas as a carrier gas, at a flow rate of about 1-10 SCCM. At this time, electromagnetic energy at a frequency in the range of about 400 to 800 MHz is applied by the electromagnetic energy plasma generator at between 10-100 watts of power. Then the reactor is charged with the monomer to be deposited on the substrate at a flow rate of about 1-10 SCCM. Typical operating pressure is about $10^{-1}$ to $10^{-2}$ Torr. The applied electromagnetic energy initiates a glow discharge causing deposition of the plasma polymerized thin film.

Thin film, oxygen-containing fluoropolymer materials are produced by the subject process from oxygen-containing fluorocarbon monomers, preferably containing a stoichiometric amount of oxygen (one oxygen per molecule). The thin film deposited is a dense and substantially pinhole- and void-free film due to cross-linking. The thickness of the thin film is determined by the length of time for which the substrate is exposed to the polymerizing plasma. Generally, using the type of apparatus and the operating parameters disclosed above, a deposition rate of approximately 1,000 Angstroms/minute is achieved. A thickness of 60,000 Angstroms is attained over a 60 minute period, and films up to 100,000 Angstroms thick can be deposited at this rate.

Figure 2:
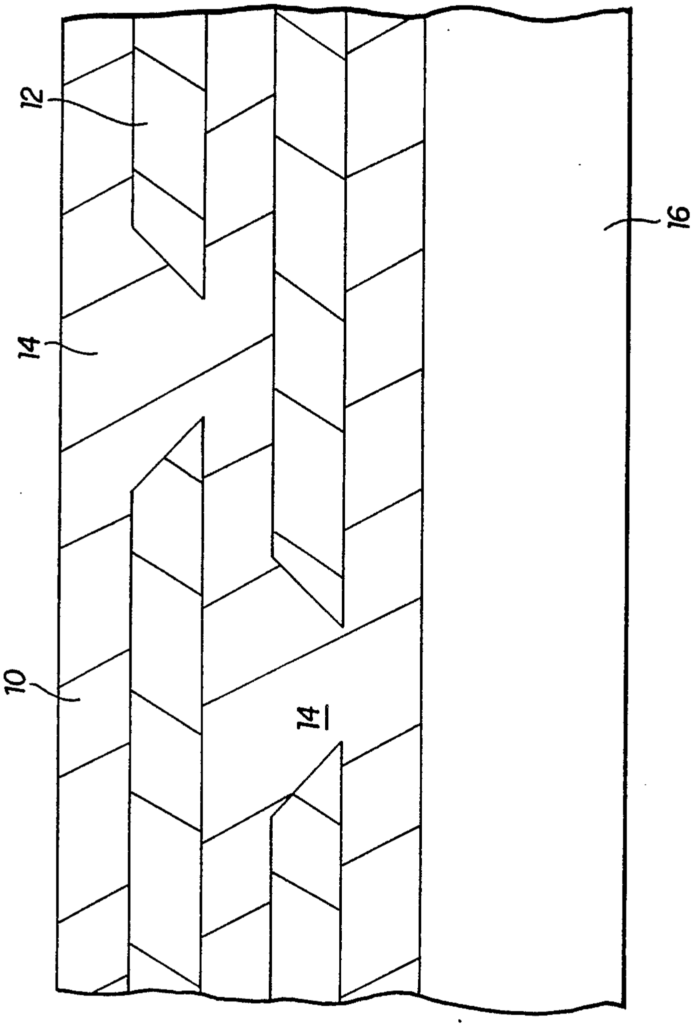
FIG. 2 is a diagramatic view of a multi-layer conductive structure.

The deposition of a flourine- and oxygen-containing monomer, deposited as a thin film on an appropriate substrate by the above process, is useful as an electric insulator, as it maintains efficient and effective charge separation. The oxygen-containing thin film fluoropolymer material disclosed herein, due to the low dielectric constant and excellent bonding characteristics, has further application in multi-layer conductive structures useful as substrates for the mounting of semiconductor chips, or in structures tenaciously bonded to ceramic substrates. FIG. 2 is a diagramatic view of a multi-layer conductive structure. In this type of structure, the thin film layer (12) functions as an isolation layer between adjacent layers of conductive material (10), these conductive layers being connected by vias (14) of conductive material which penetrate the thin film. This type of structure could be formed by first depositing by an appropriate means, such as by evaporation, a continuous layer of a conductive metal, such as copper, on a substrate (16). This conductive metal layer should then be masked in small areas, such as by placing a dot of masking material on the metal. An oxygen-containing fluorocarbon monomer is then plasma polymerized to deposit a thin film of fluoropolymer over the conductive metal layer. The mask is then removed, and a second layer of conductive metal is deposited over the fluoropolymer thin film. This second layer of conductive metal will also fill in the areas that were masked, creating vias of conductive metal material connecting adjacent conductive metal layers. This sequence may be repeated several times in making a multi-layer conductive structure.

While capacitor and multi-layer conductive structure fabrication are a few useful applications of the instant process and resulting material, other uses will be apparent to those skilled in the art.

SPECIFIC EXAMPLE

The following examplary process is presented to more thoroughly explain the instant invention, but is not intended to be limitative thereof. The example demonstrates the use of an oxygen-containing fluorocarbon compound as a precursor monomer for the production of a fluoropolymer thin film possessing the desired deposition rate and dielectric constant properties.

EXAMPLE 1

A glass substrate upon which the fluoropolymer thin film was to be deposited was placed in a Surfatron reaction tube, which was evacuated to $10^{-3}$ Torr over a 1-3 hour period. Argon was charged to the reactor at 0.2 Torr at 4 cc/minute, and heptafluorobutanol was charged to the reactor at 1 cc/minute. Electromagnetic energy at a frequency of 450 MHz was directed into the reactor at a current density of 20 Watts. The surface of the glass substrate was uniformly coated with a dense thin film of oxy-fluoropolymer.

In order to observe the consistency of the deposition rate over an extended period of time, the process recited above was carried out to prepare several different samples. The substrates were exposed to the polymerizing plasma for increasing increments of 10 minutes, and the thickness of the film deposited on each substrate was then measured. The times and thicknesses are plotted in FIG. 1. As the figure indicates, the deposition rate of the fluoropolymer thin film resulting from the use of an HFB monomer remains constant at 1,000 Angstroms/-minute for extended periods of time.

For purposes of examining the dielectric property of HFB films, capacitors were fabricated using the following procedure. Glass substrates were ultrasonically cleaned sequentially in detergent, water, acetone and methanol and dried in a nitrogen stream. These substrates were covered with 1000 to 1500 Angstroms of thermally evaporated gold. Approximately $\frac{1}{3}$ of the gold area was then masked and an HFB film was deposited over the unmasked portion of the gold-coated substrate, by the method of Example 1, ranging from 2,500 Angstroms to 15,000 Angstroms. A thin dot pattern mask, the hole diameter of which was 0.3 cm, was then placed over these composite samples and a top layer of gold dots, 1,000 Angstroms thick, was thermally evaporated on the sample to complete the capacitor fabrication.

Impedance analysis of the films was performed using a Solartron 1250 frequency response analyzer with a Solartron 1286 potentiostat used as an impedance buffer. Data acquisition and manipulation were controlled using the Solartron 1090 Data Management System Software. The sine wave amplitude was 100 mV. Data was acquired in the log mode at a rate of 5 data points per decade of frequency and 100 measurements of impedance were averaged at each frequency.

Film capacitance (C) was calculated using the following equation:

$$C = \frac{-1}{2\pi f Z \sin\theta}$$

where f is the measurement frequency (Hz), and $\theta$ and Z and the phase angle and total impedance at f. The dielectric constant ($\kappa$) was calculated according to the following equation:

$$C = \frac{\epsilon \kappa A}{d}$$

where $\epsilon$ is the permittivity of free space ($8.85\times10^{-14}$ F/cm), A is the area of the capacitor "plate" and d is the dielectric thickness.

Table 1 sets forth the calculated dielectric constants for the various thicknesses of HFB thin film that were prepared as stated hereinabove.

TABLE 1

| Heptafluorobutanol Thin Film Dielectric Constant | | |
|---|---|---|
| Deposition Time (Minutes) | Thin Film Thickness (Angstroms) | Dielectric Constant (at 1030 Hz) |
| 2.3 | 2,500 | 2.68 |
| 5.0 | 5,000 | 2.44 |
| 7.5 | 7,500 | 2.88 |
| 10.0 | 10,000 | 2.30 |
| 15.0 | 15,000 | 2.68 |

The dielectric constant of the HFB thin film was, therefore, determined to be approximately 2.6.

It is to be understood that the foregoing example and procedure has been provided to enable those skilled in the art to have representative parameters by which to evaluate the invention and that this information should not be construed as any limitation on the scope of this invention. Inasmuch as the thin film composition and substrate choice can be varied within the scope of the total specification disclosure, neither the particular monomer or substrate, nor the specific operating parameters exemplified herein, shall be construed as limitations of the invention.

Thus, it is believed that any of the variables disclosed herein can readily be determined and controlled without departing from the spirit of the invention herein disclosed and described. Moreover, the scope of the invention shall include all modification and variations that fall within that of the attached claims.

What we claim is:

1. A process for the deposition of an oxygen-containing, high fluoropolymer thin film onto an appropriate substrate comprising:

(a) loading said substrate in an enclosed reactor;
(b) evacuating said reactor;
(c) charging said reactor with an inert carrier gas and an oxygen-containing fluorocarbon monomer feed gas; and
(d) plasma-polymerizing said feed gas such that a thin film of polymerized monomer is deposited onto said substrate, wherein said monomer is a compound selected from the group consisting of:

alcohols having the formula

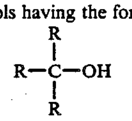

ethers having the formula

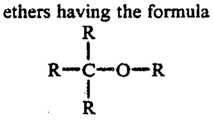

epoxides having the formula

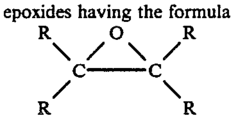

peroxides having the formula
R—O—O—R wherein at least one R is defined as a per fluorinated linear, branched or cyclic saturated alkyl group having at least 1 to 9 carbons, and the remaining R groups are selected from the group consisting of H; linear, branched or cyclic saturated alkyl groups; fluorinated linear, branched or cyclic saturated alkyl groups; perfluorinated linear, branched or cyclic saturated alkyl groups; and each of said alkyl groups may optionally contain one or more alcohol, ether, peroxide or epoxide functionalities.

2. The process of claim 1 wherein said monomer is selected from the group consisting of heptafluorobutanol, pentafluorodimethyl ether, perfluoropropylene oxide, and bis(trifluoromethyl) peroxide.

3. The process of claim 1 wherein said monomer is heptafluorobutanol.

4. The process of claim 1 wherein said substrate is selected from the group consisting of glass, plastic and metal.

5. The process of claim 1 wherein said fluoropolymer thin film is deposited at a rate of about 1,000 Angstroms/minute for a period of from about 1 minute to about 60 minutes.

6. The process of claim 1 wherein said inert carrier gas is argon or helium.

* * * * *